United States Patent
Rodriguez et al.

(10) Patent No.: US 7,238,415 B2
(45) Date of Patent: Jul. 3, 2007

(54) MULTI-COMPONENT CONDUCTIVE POLYMER STRUCTURES AND A METHOD FOR PRODUCING SAME

(75) Inventors: Nelly M. Rodriguez, Hopkinton, MA (US); R. Terry K. Baker, Hopkinton, MA (US)

(73) Assignee: Catalytic Materials, LLC, Pittsboro, NC (US)

( * ) Notice: Subject to any disclaimer, the term of this patent is extended or adjusted under 35 U.S.C. 154(b) by 382 days.

(21) Appl. No.: 10/898,077

(22) Filed: Jul. 23, 2004

(65) Prior Publication Data
US 2006/0019079 A1   Jan. 26, 2006

(51) Int. Cl.
*B32B 27/12* (2006.01)
*H01B 1/00* (2006.01)

(52) U.S. Cl. .............. 428/297.4; 428/300.7; 428/373; 428/374; 252/500; 252/511; 977/700; 977/778; 523/200

(58) Field of Classification Search .............. 252/500; 977/700, 712, 742, 778, 783, 784, 785; 428/373, 428/374
See application file for complete search history.

(56) References Cited

U.S. PATENT DOCUMENTS

| | | | |
|---|---|---|---|
| 4,663,230 A | | 5/1987 | Tennent |
| 5,149,584 A | | 9/1992 | Baker et al. |
| 5,213,892 A | * | 5/1993 | Bruckner ................ 428/372 |
| 5,413,866 A | | 5/1995 | Baker et al. |
| 5,591,382 A | | 1/1997 | Nahass et al. |
| 5,611,964 A | | 3/1997 | Friend et al. |
| 5,618,875 A | | 4/1997 | Baker et al. |
| 5,651,922 A | | 7/1997 | Nahass et al. |
| 5,744,235 A | | 4/1998 | Creehan |
| 5,908,585 A | | 6/1999 | Shibuta |
| 5,968,650 A | | 10/1999 | Tennent et al. |
| 6,113,819 A | | 9/2000 | Tennent et al. |
| 6,395,392 B1 | | 5/2002 | Gownder |
| 6,537,515 B1 | | 3/2003 | Baker et al. |
| 6,764,628 B2 | * | 7/2004 | Lobovsky et al. ...... 264/172.15 |
| 2002/0129864 A1 | * | 9/2002 | Arthurs et al. .......... 139/384 R |
| 2003/0089893 A1 | | 5/2003 | Niu et al. |
| 2005/0170177 A1 | * | 8/2005 | Crawford et al. ........... 428/375 |
| 2005/0250895 A1 | * | 11/2005 | Baker et al. ................. 524/496 |
| 2006/0060825 A1 | * | 3/2006 | Glatkowski ................ 252/500 |

OTHER PUBLICATIONS

M. Sennett, et al., "Dispersion and Alignment of Carbon Nanotubes in Polycarbonate", Applied Physics A, vol. 76, pp. 111-113 (2003).
"Conductive Polymers and Plastics in Industrial Applications", Society of Plastics Engineers, p. 149 (1999).

* cited by examiner

*Primary Examiner*—Jill Gray
(74) *Attorney, Agent, or Firm*—Henry E. Naylor; Kean, Miller, Hawthorne, D'Armond, McCowan & Jarman, LLP

(57) ABSTRACT

Novel electrically conductive polymer composite structures having a horizontal plane that contain effective amounts of two different types of conductive graphitic nanofibers. The first type of graphitic nanofiber is aligned substantially parallel to the horizontal plane of the polymer structure and are comprised of graphite platelets that are aligned substantially parallel to the longitudinal axis of the nanofiber. The second type of conductive graphite nanofiber are aligned at an angle to the horizontal plane of the polymer structure and are comprised of graphite platelets aligned at an angle to the longitudinal axis of the nanofiber. The conductive polymer composite structures are further comprised of one or more polymer layers.

33 Claims, 3 Drawing Sheets

Schematic Renditions of Various Types of Graphite Nanofibers

| Platelet | Tubular | Ribbon | Faceted Tubular | Herringbone |
| 1a | 1b | 1c | 1d | 1e |

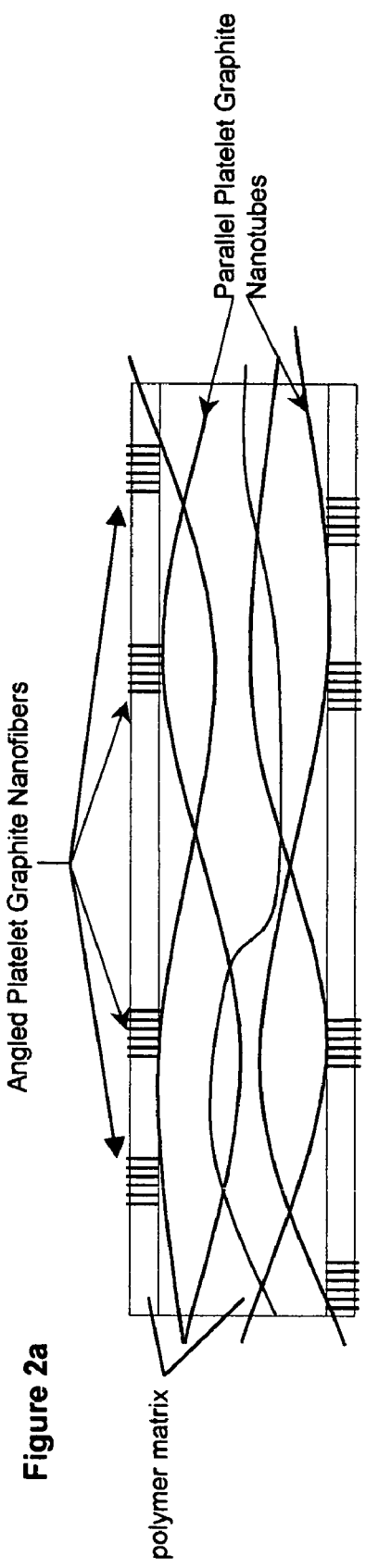
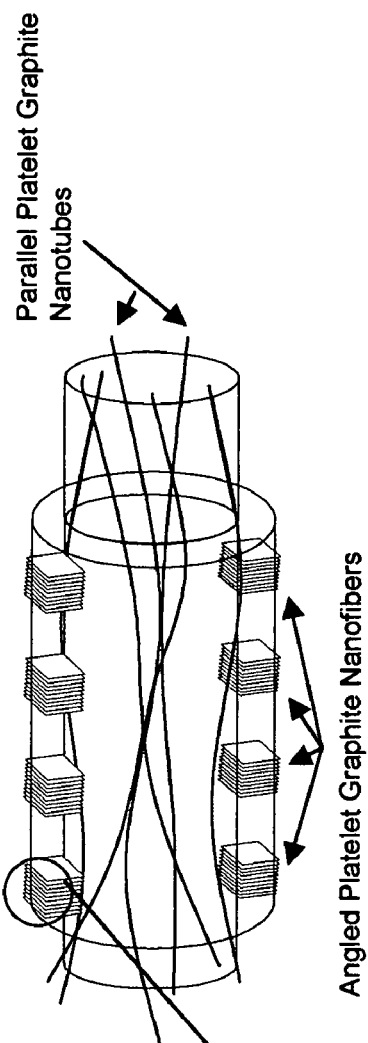
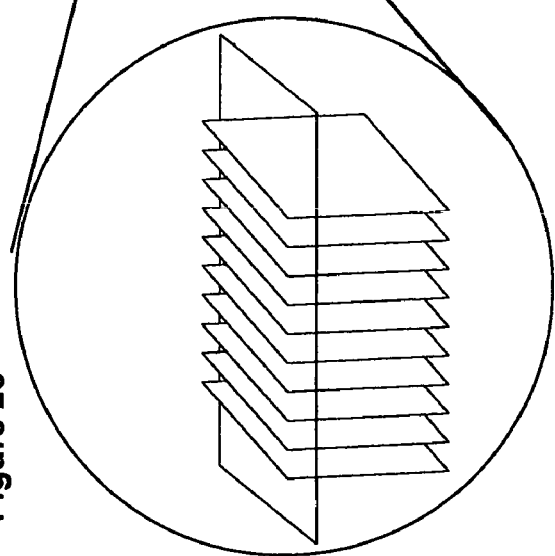

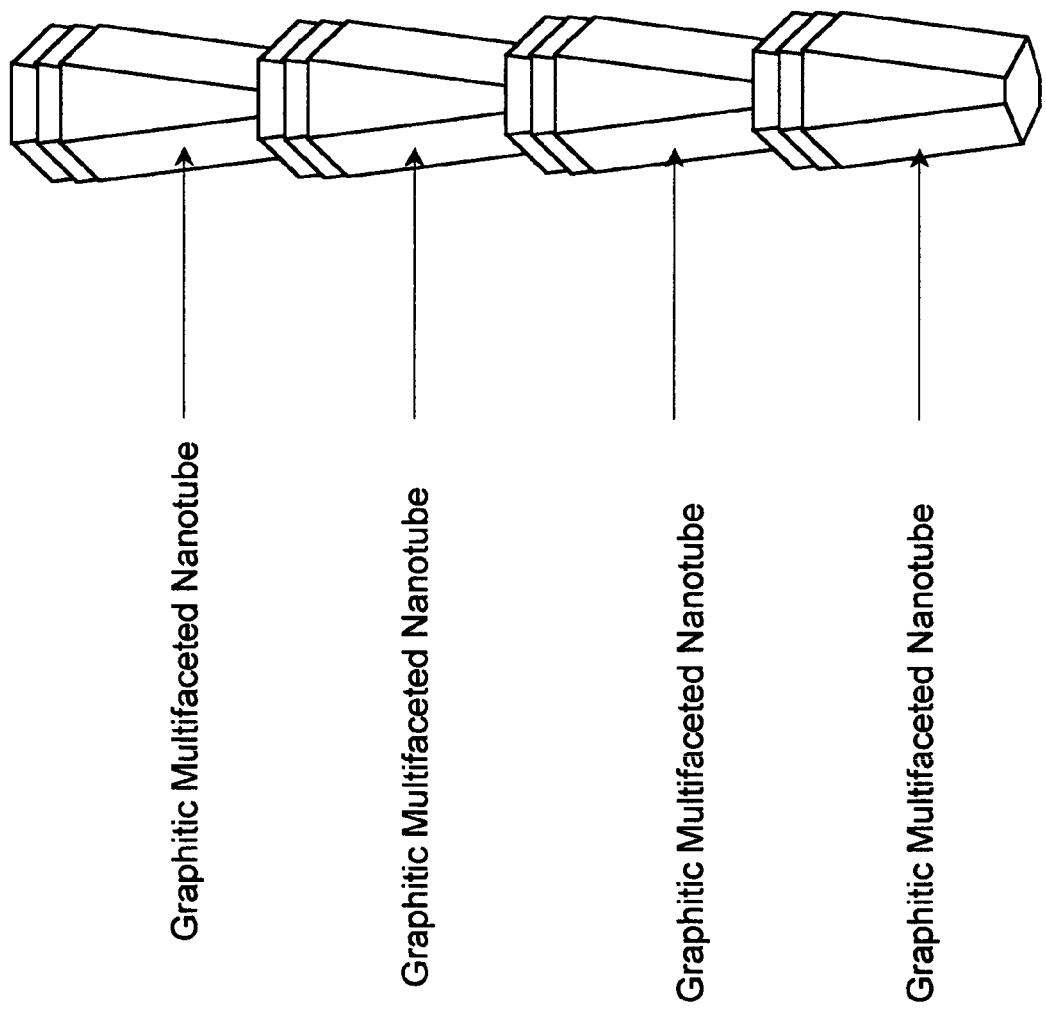

MULTI-COMPONENT CONDUCTIVE POLYMER STRUCTURES AND A METHOD FOR PRODUCING SAME

FIELD OF THE INVENTION

This invention relates to novel electrically conductive polymer composite structures having a horizontal plane that contain effective amounts of two different types of conductive graphitic nanofibers. The first type of graphitic nanofiber is comprised of graphite platelets that are aligned substantially parallel to the longitudinal axis of the nanofiber. The second type of conductive graphite nanofiber that is comprised of graphite platelets that are aligned at an angle to the longitudinal axis of the nanofiber. Further, a fraction of the graphite platelets constituting the latter nanofibers protrude from the polymer surface, thus allowing electrons to flow to these exposed regions. The conductive polymer composite structures are further comprised of one or more polymer layers.

BACKGROUND OF THE INVENTION

It is well established that the incorporation of certain types of carbon nanofibers into polymeric materials can impart electrical conductivity to such materials that are generally regarded as insulators. Carbon nanofibers can be dispersed in a polymer by various well-known techniques such as melting and kneading to form an admixture that can be subsequently shaped to form an electrically conductive article. The use of a conductive fiber is highly desirable since a given weight of such a material generates a large number of contact points within a polymer matrix. The widespread interest in electrically conductive polymers is stimulated by the possibility that such materials could have utility in semiconductor chips, integrated circuits, lightweight battery components, sensors, electro-chromic displays, anti-static coatings, static dissipation, fuel hoses, connectors and packaging items.

Various types of carbon nanofibers have been suggested as being suitable for use as conductive filler components for polymeric materials. For example, U.S. Pat. Nos. 4,663,230, 5,618,875 and 5,908,585 teach of the use of incorporating fibrils and carbon filaments (also known as carbon nanofibers) into polymeric matrices to render the composite materials electrically conductive. Chemical, physical and electrical advantages resulting from chemical functionalization of the surfaces of carbon nanotubes prior to imbedding the nanofibers into a polymer matrix are disclosed in U.S. patent application Ser. No.20030089893.

While there are many current commercial applications for conductive polymers in the form of films and sheets, a need exists to develop such materials in the form of a fiber. Thermoplastics such as nylon and polyester that contain traditional particulate conductive fillers such as carbon black, metal or metal oxide powders are difficult to extrude and draw into a fiber. The ability to decrease the percent weight of filler in the resulting polymer fiber without sacrificing the electrical conductive properties can be achieved by substituting carbon nanofibers for the traditional powdered additive. Because of their high aspect ratio (length/diameter) of about 100 to 1000, carbon nanofibers contact each other over a much larger surface area than the spherically shaped conventional powdered particles for a given loading. Such a material, however, suffers from the fact that while the bulk properties of the polymer exhibit high electrical conductivity, the poor contact of the conductive component with the exposed polymer surface results in a significantly lower electrical conductivity in those regions. Measurements performed on polymer composites containing metal coated carbon fibers indicate that the surface conductivity is between $10^3$ to 105 times lower than that of the bulk conductivity ("Conductive Polymers and Plastics in Industrial Applications" {Larry Ruppercht Editor} Society of Plastics Engineers page 149, (1999). Consequently, there is a need in the art for polymer structures, including both sheets and fibers that have both high bulk conductivity and high surface conductivity.

SUMMARY OF THE INVENTION

In accordance with the present invention, there is provided a conductive polymeric composite structure having a horizontal plane, which polymeric composite structure is comprised of: at least one polymer layer wherein the conductivity is provided by: i) an effective amount of a first conductive graphitic nanofiber comprised of graphite platelets that are aligned substantially parallel to the longitudinal axis of the nanofiber ("parallel platelet graphite nanofibers") and which first graphitic nanofiber is aligned substantially parallel to the horizontal plane of the composite polymeric composite structure; and ii) an effective amount of a second conductive graphitic nanofiber comprised of graphite platelets that are aligned at an angle to the longitudinal axis of the nanofiber ("angled platelet graphite nanofibers") and where said second conductive graphitic nanofibers are also aligned substantially parallel to the horizontal plane of the polymeric composite structure, and wherein the angled platelet graphite nanofibers are located at an outermost layer of the polymer structure; wherein a fraction of the angled graphite platelet nanofibers protrude from the polymer surface.

In a preferred embodiment, the polymeric composite structure is comprised of a plurality of polymer layers having at least one outer layer and wherein the at least one outer layer contains an effective amount of conductive angled platelet graphitic nanofibers wherein at least one of the remaining layers contains an effective amount of conductive parallel platelet graphitic nanofibers.

In another preferred embodiment, the polymer structure is a fiber comprised of a polymer core and a surrounding polymer sheath layer wherein the polymer core contains an effective amount of conductive parallel platelet graphitic nanofibers aligned substantially parallel to the longitudinal axis of the fiber. The outer sheath polymer layer contains an effective amount of conductive angled platelet graphitic nanofibers also aligned substantially parallel to the longitudinal axis of the fiber.

In still another preferred embodiment, the parallel platelet graphite nanofiber is selected from the group consisting of "ribbon" graphite nanofibers, single-walled carbon nanotubes, cylindrical carbon nanotubes, fibrils and both single walled and multi-walled multi-faceted graphite nanotubes.

In yet another preferred embodiment there is provided a gas diffusion layer material comprised of a sheet of polytetrafluoroethylene material having disposed therein an effective amount of a mixture of conductive angled and parallel platelet graphitic nanofibers both aligned substantially parallel to the horizontal plane of the sheet.

BRIEF DESCRIPTION OF THE FIGURES

FIGS. 2a and 2b are representations of a preferred conductive polymer fiber of the present invention having a high surface conductivity and a high core conductivity. The fiber contains a core polymer material containing parallel platelet graphite nanofibers and the sheath, or outer layer containing angled platelet graphite nanofibers. FIG. 2c is an enlarged section of the structure of FIG. 2b showing edges of the angled graphite platelet nanofiber protruding from the polymer surface. Both types of graphitic nanofibers are aligned substantially parallel to the horizontal, or longitudinal, plane of the polymer shape with a fraction of the angled graphitic platelet nanofibers protruding from the surface of the polymer shape.

FIG. 3 is a representation of a multi-walled multi-faceted tubular nanofiber.

DETAILED DESCRIPTION OF THE INVENTION

Figure 1:
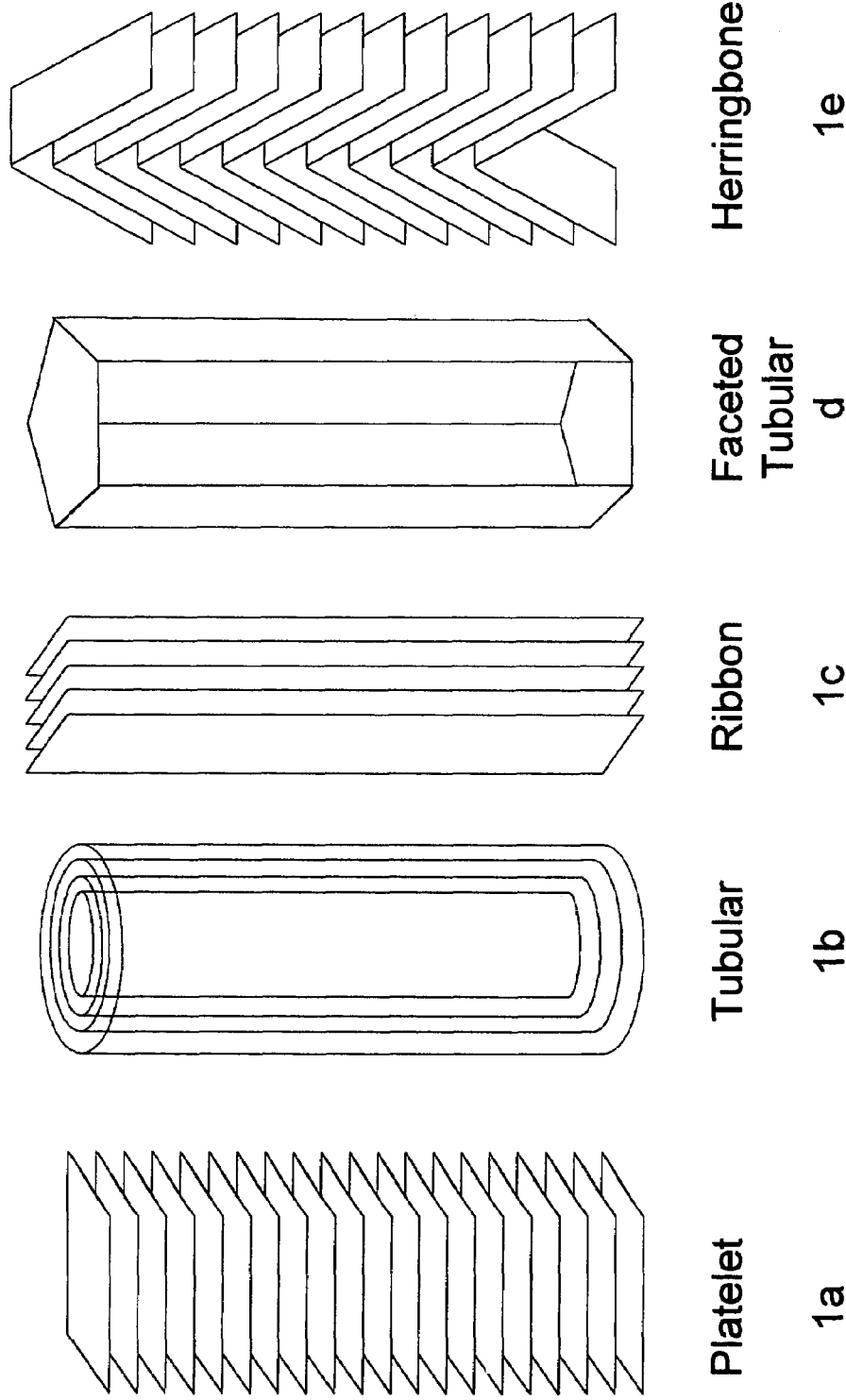
FIG. 1a is a representation of a platelet carbon nanofiber that is comprised of substantially graphite platelets that are aligned substantially perpendicular to the longitudinal axis, or growth axis, of the nanofiber. This type of structure can also be referred to as a nanofiber.
FIG. 1b is a representation of a cylindrical carbon nanofiber that is comprised of continuous carbon platelets and is in the form of tube within a tube within a tube and having a substantially hollow center. This type of structure is sometimes referred to as a "fibril".
FIG. 1c is a representation of a ribbon carbon nanofiber of the present invention that is comprised of graphitic platelets that are substantially parallel to the longitudinal axis of the nanofiber. The graphitic platelets, or sheets, are discontinuous (not joined) and thus do not form a tubular structure.
FIG. 1d is a representation of a single walled faceted tubular carbon nanofiber of the present invention and is comprised of connected platelets, or sheets, of graphic carbon having multifaceted flat faces. The graphitic sheets are also aligned substantially parallel to the longitudinal axis of the nanofiber.
FIG. 1e is a representation of a herringbone carbon nanofiber wherein the graphitic platelets, or sheets, are at an angle (other than 90°) to the longitudinal axis of the nanofiber.

The conductive polymer composite materials of the present invention have superior conductivity properties when compared to conventional conductive polymeric materials. Conventional conductive polymer shapes typically have good internal conductivity, but the conductivity at the surface of the shape is low, if at all present. The conductive polymer structures of the present invention have both high conductivity in the interior of the structure as well as high conductivity at the surface. This is primarily due to the use of two unique types of graphite nanofibers. These graphite nanofibers are themselves comprised of a plurality of graphite sheets that are aligned parallel or at an angle to the longitudinal (growth) axis of the nanofiber. The terms "sheets" and "platelets" are used interchangeably herein. For convenience, those graphite nanofibers wherein the graphite platelets are aligned substantially parallel to the longitudinal axis are referred to as "parallel platelet graphite nanofibers" and those wherein the graphite platelets are at an angle are referred to as "angled platelet graphite nanofibers". The superior surface conductivity of the resulting polymer composites of the present invention are primarily due to the fraction of angled graphitic platelet nanofibers protruding from the surface of the polymer composite. These angled graphitic platelet nanofibers have edge sites that contribute to the surface conductivity of the polymer shape, thus allowing electrons to flow to the exposed edge sites.

The graphite nanofibers at the polymer surface are an effective amount of the angled platelet graphite nanofibers. By "effective amount" we mean that minimum amount required to provide the desired conductivity. This amount will typically be from about 0.075 wt. % to about 10.0 wt. %, preferably from about 0.075 wt. % to about 6.0 wt. %, and more preferably from about 0.075 wt. % to about 2.0 wt. %, based on the total weight of the polymer component containing the dispersed graphitic nanofiber material. It is preferred that the angle of the angled graphite nanofibers composing the nanofiber be from about greater than 0° to about 90°, preferably from about 30° to about 90°, more preferably from about 45° to about 90°, and most preferably about 90°. These types of graphite nanofibers are sometimes referred to as "platelet" graphite nanofibers when the graphite platelets are at substantially a 90° and as "herringbone" graphite nanofibers when the graphite platelets are at an angle less than 90°. The terms "nanostructure" and "nanofiber" are sometimes used interchangeably herein.

Angled platelet graphite nanofibers have a unique set of properties that include: (i) a surface area from about 40 to 250 m$^2$/g, preferably from about 50 to 200 m$^2$/g, more preferably from about 80 to 180 m$^2$/g, and most preferably from about 80 to 150 m$^2$/g, which surface area is determined by $N_2$ adsorption at –196° C.; (ii) a crystallinity from about 5% to about 100%, preferably from about 50% to 100%, more preferably from about 75% to 100%, most preferably from about 90% to 100%, and ideally substantially 100%; and (iii) interstices of about 0.335 nm to about 1.1 nm, preferably from about 0.335 to about 0.67 nm, and more preferably from about 0.335 nm to about 0.40 nm. The interstices are the distance between the graphite sheets. Non-limiting examples of preferred overall shapes for all graphite nanofibers used herein include straight, branched, twisted, spiral, helical, and coiled. The surface of the graphite nanofibers will comprise at least 50% edge sites, more preferably at least 75% and most preferably at least 95%.

The interior of the polymer composite contains an effective amount of conductive parallel platelet graphite nanofibers. Non-limiting examples of such nanofibers include those selected from the group consisting of "ribbon" graphite nanofibers, single-walled carbon nanotubes, single and multi-walled substantially cylindrical carbon nanotubes, fibrils and both single walled and multi-walled multi-faceted graphite nanotubes. Preferred are multi-faceted graphite nanotubes and ribbon graphite nanofibers, more preferred are the multi-faceted graphite nanotubes, and most preferred are multi-walled multi-faceted nanotubes (tube within a tube structure). By "multifaceted" we mean that the tubular structure will be somewhat like the structure of a multi-faced pencil or "Allen" wrench. Typically, the multifaceted graphitic nanotube structure will be multifaceted nanotube within a multifaceted nanotube structure. The multifaceted aspects comes about by the bonding of rectangular graphite platelets along their longitudinal axis. The ribbon nanofiber is also included in this set of preferred carbon nanofibers since the graphite platelets will also be aligned substantially parallel to the longitudinal axis of the nanofiber. The primary difference between the multi-faceted nanotube structure and the "ribbon" structure is that the graphite sheets for the multi-faceted structure are bonded as previously described and the sheets are discontinuous for the "ribbon" structure. Preferred parallel platelet graphite nanofibers of the present invention are those wherein at least about 1%, preferably at least about 50%, more preferably at least about 80%, and most preferably at least about 95% of the edge sites are exposed.

Parallel platelet graphite nanofibers will have properties that include: (i) a surface area from about 20 to 3,000 m$^2$/g, preferably from about 50 to 800 m$^2$/g, more preferably from about 100 to 700 m$^2$/g, and most preferably from about 250 to 350 m$^2$/g, which surface area is determined by N$_2$ adsorption at −196° C.; (ii) a crystallinity from about 5% to about 100%, preferably from about 50% to 100%, more preferably from about 75% to 100%, most preferably from about 90% to 100%, and ideally substantially 100%; and (iii) interstices of about 0.335 nm to about 0.40 nm, preferably about 0.335 nm. The interstices are the distance between the graphite sheets.

Carbon nanofibers are generally grown by use of a supported or unsupported catalytically active metal, such as an Fe group metal, at elevated temperatures in a carbon-containing gaseous atmosphere. The catalysts used to prepare the preferred graphitic nanofibers of the present invention are iron:copper bulk bimetallic catalysts in powder form (bulk) in a CO/H$_2$ atmosphere.

The average powder particle size of the metal catalyst will range from about 0.5 nanometer to about 5 micrometer, preferably from about 2.5 nanometer to about 1 micrometer. The ratio of the two metals can be any effective ratio that will produce substantially crystalline carbon nanofibers in which the graphite sheets are substantially perpendicular to the longitudinal axis of the nanofiber, at temperatures from about 550° C. to about 670° C. in the presence of a mixture of CO/H$_2$. The ratio of iron:copper will typically be from about 5:95 to about 95:5, preferably from about 3:7 to about 7:3; and more preferably from about 6:4 to about 7:3. The bimetallic catalyst can be prepared by any suitable technique. One preferred technique is by co-precipitation of aqueous solutions containing soluble salts of the two metals. Preferred salts include the nitrates, sulfates, and chlorides of iron and copper, particularly iron nitrate and copper nitrate. The resulting precipitates are dried and calcined to convert the salts to the mixed metal oxides. The calcined metal powders are then reduced at an effective temperature and for an effective time.

The iron:copper catalyst powders used in the present invention are prepared by the co-precipitation of aqueous solutions containing appropriate amounts of nickel and copper nitrate using ammonium bicarbonate. The precipitates were dried overnight at the 110° C. before being calcined in air at 400° C. to convert the carbonates into mixed metal oxides. The calcined powders were then reduced in hydrogen for 20 hours at 400° C. Following this treatment the reduced catalyst was cooled to room temperature in a helium environment before being passivated in a 2% oxygen/helium mixture for 1 hour at about room temperature (24° C.).

Gas flow reactor experiments were carried out in a horizontal quartz tube (40 mm i.d. and 90 cm long) contained in a Linberg tube furnace, at temperatures over the range of about 450° C. to 700° C. Gas flow rates to the reactor were regulated by MKS mass flow controllers. In a typical experiment 50 mg of the given catalyst powder was dispersed in a substantially uniform manner along the base of a ceramic boat, which was subsequently placed at the center of the reactor tube. After reduction of the sample at 600° C. for 2 hours, the system was flushed with helium and brought to the desired temperature level before being reacted with in the CO/H$_2$ mixture for a period of 2 hours. The total amount of solid carbon formed in any given experiment was determined at the completion of the reaction by weight difference. The composition of the gas phase was measured at regular intervals by taking samples of the inlet and outlet streams, which were then analyzed by gas chromatography using a 30 m megabore (CS-Q) capillary column in a Varian 3400 GC unit. Carbon and hydrogen atom balances, in combination with the relative concentrations of the respective components, were applied to obtain the various product yields. In order to obtain reproducible carbon deposition data it was necessary to follow an identical protocal for each experiment.

The structural details of the carbon materials resulting from the interaction of the CO/H$_2$ mixtures with the various powdered bimetallic catalysts were examined in a JEOL 2000 EX II transmission electron microscope that was fitted with a high resolution pole piece capable of providing a lattice resolution of 0.18 nm. Temperature programmed oxidation studies (TPO) of the various carbon materials were carried out in a Cahn 2000 microbalance in the presence of a CO$_2$/Ar (1:1) mixture at a heating rate of 5°/min up to a maximum of a given carbon deposit from a comparison the oxidation profile with those of two standard materials, amorphous carbon and single crystal graphite when treated under the same conditions.

It is known that carbon nanofibers can be prepared by reacting a catalyst in a heating zone with the vapor of a suitable carbon-containing compound. While the art teaches a wide variety of carbon-containing compounds as being suitable, the inventors hereof have found that only a mixture of CO and H$_2$ will yield carbon nanofibers with unexpected high crystallinities. That is, crystallinities greater than about 95%, preferably greater than 97% more preferably greater than 98%, and most preferably substantially 100%.

After the nanofibers are grown, it may be desirable to treat them with an aqueous solution of an inorganic acid, such as a mineral acid, to remove any excess catalyst particles. Non-limiting examples of suitable mineral acids include sulfuric acid, nitric acid, and hydrochloric acid. Preferred is sulfuric acid. The nanofibers of the present invention can also be treated in an oxidizing environment such as nitric acid, potassium permanganate, hydrogen peroxide or other liquid phase oxidants, or oxygen, ozone or carbon dioxide. Such oxidation treatments will endow the graphitic nanofibers with oxygen functionalities and facilitate dispersion and segregation of the nanofibers to the polymer surfaces.

The preferred catalyst for growing multi-faceted graphite nanotubes is Co and MgO or Ni and MgO at a temperature of about 550° C. to about 670° C. in an atmosphere of CO and H$_2$.

The multi-component layered electrically conductive polymer composites of the present invention can have various forms or structures. Non-limiting examples of such forms include fibers, sheets, thick films, and thin films. The film can be applied by any suitable means. For example, it can be a mixture of carbon nanofibers and polymer particles, which is then electrostatically applied as an overcoating on a dielectric material, such as a polymer surface, thus providing the surface of the polymer with superior conductivity properties. A film produced in accordance with the present invention can also be applied as an ink or paint using a suitable liquid carrier including organic solvents and water. Paint and ink blending and application to a desired target are well known technologies and will not be discussed in detail herein. Any conventional paint and ink formulation technique along with conventional additives can be used in the practice of the present invention. Also, all conventional paint and ink application techniques including spraying, electrostatic application, and printing from an ink head can be used to apply the graphite nanofiber containing polymer composites of the present invention.

If the desired polymer composite form is a fiber, it is preferred that it be of a "core and sheath" arrangement or a "side-by-side" arrangement, more preferably a core and sheath arrangement. This type of structural arrangement is one that will provide the resulting polymer fiber with a highly conductive inner region that is covered by a skin, or sheath, that functions as a conduit to provide surface conductivity to the polymer fiber. This same concept can be utilized for polymer sheets and films. If the desired polymer composite is a sheet comprised of a single layer of polymer material, then a mixture of an effective amount of both the angled and the parallel platelet graphite nanofibers of the present invention will be mixed into the polymer matrix. Typically, during conventional polymer shaping or forming, including the forming of polymer sheets, as well as fibers, the angled platelet graphite nanofibers will tend to migrate to the surface of the polymer structure and provide superior conductivity properties to the surface. If the desired polymer structure is comprised of two polymer layers fused to each other, then each layer will also be comprised a mixture of an effective amount of both the angled and the parallel platelet graphite nanofibers. Each layer can be the same or of a different polymer. A preferred structure would be wherein one layer is comprised of an isotactic polypropylene and the other layer is comprised of a syndiotatic polypropylene. This is a particularly preferred arrangement for the core and sheath fiber of the present invention. It may also be desirable that for a bi-layered structure one layer serve as the surface layer and contain only the angled platelet graphite nanofibers and the other layer contain only parallel platelet graphite nanofibers or a blend of both the angled and parallel platelet graphite nanofibers. When the desired polymer structure is comprised of three or more layers, or wherein the resulting structure is one which have an interior polymer layer or component, and an exterior polymer layer of component, then the interior polymer layer of component can only contain the parallel platelet graphite nanofiber and the exterior layer(s) or component(s) can contain an effective amount of only the angled platelet graphite nanofiber. Of course, each layer of any numbered layered structure can contain a mixture of an effective amount of each of the angled and parallel graphite nanofibers. It will be understood that each polymer layer or component can be comprised of the same or a different polymer type. For example, The carbon nanofibers of the current invention are dispersed in a suitable polymer matrix by any of various procedures that are well established to those having ordinary skill in the art. Non-limiting examples of such procedures include, melt blending of the carbon nanofibers with the polymer matrix at a high shear rate; via electro-dispersion techniques; or mechanical mixing of the carbon nanofibers with dry polymer under intense agitation followed by melting of the mixture. The amount of graphitic nanofiber dispersed in any given polymer component will of course be dependent on the intended end-use of the conductive polymer shape. Generally, each polymer component will contain an effective amount of graphitic nanofiber material. As previously mentioned, by effective amount, we mean that amount that will provide the polymer component with the desired electrical conductive properties. This amount will typically be from about 0.075 wt. % to about 10.0 wt. %, preferably from about 0.075 wt. % to about 6.0 wt. %, and more preferably from about 0.075 wt. % to about 2.0 wt. %, based on the total weight of the polymer component containing the dispersed graphitic nanofiber material.

The polymer used in the practice of the present invention can be any suitable polymer material, however, thermoplastic materials are preferred for fibers. Non-limiting examples of suitable thermoplastic polymers include nylons, polyesters, polyolefins, polycarbonates, polyamides and polyethyleneterephthalates. Another preferred polymer is polytetrafluoroethylene, particularly when the resulting polymer structure is a sheet used as a gas diffusion layer.

Another preferred polymer structures is a single sheet gas diffusion layer comprised of polytetrafluoroethylene and containing an effective amount of each of the parallel platelet and angled platelet graphite nanofibers. At least a fraction of the angled graphitic nanofiber will protrude the surface of the polytetrafluoroethylene sheet. The gas diffusion layer is a critical element of the electrode component of a PEM fuel cell. It serves as the support for the polymer electrolyte membrane, circulates reactant gas over a Pt catalyst and conducts electrons generated from the electrochemical reaction to the outer circuit.

The polymer components used herein can optionally contain various conventional additives. Non-limiting examples of such additives include antiblocking agents, antistatic agents, antioxidants, blowing agents, crystallization aids, colorants, dyes, flame retardants, fillers, impact modifiers, mold release agents, oils, other polymers, pigments, processing agents, reinforcing agents, stabilizers, UV resistance agents, antifogging agents, wetting agents and the like.

In order to obtain good electrical and mechanical properties, the graphitic nanofibers must not only be well dispersed in the polymer matrix, but they must be aligned along the horizontal plane of the polymer structure, or shape, and maintain contact with at least a fraction of each other in a so-called network arrangement. It is preferred that substantial all graphitic nanofibers in the polymer matrix are in contact at one other graphitic nanofiber in the matrix. This condition can be achieved by a melt spinning process, in which the molten mixture is forced through a spinneret. If necessary, an electric field can be applied at the outlet of the spinneret to orient the carbon nanofibers. In preparation for the spinning operation, the polymer/inner core parallel graphitic nanofiber mixture and the polymer/outer sheath angled graphite nanofiber mixture are dried to a moisture level required to prevent degradation of the polymer material during remelting. The polymer/inner core parallel graphitic nanofiber mixture will produce the electrically conductive component of the multi-component fiber and the polymer/outer sheath angled graphite nanofiber mixture will produce the connection between the bulk and surface regions of the fiber. This concept is presented in the schematic diagram shown in FIG. 2 hereof. The core and sheath polymer mixtures are melted in separate extruders and transferred to separate meter pumps that accurately control the flow rates of the two molten polymer streams. The polymer exits the spinneret as a molten multi-component fiber with the same shape as the spinneret hole, which is usually circular. The molten fiber undergoes extensional flow and diameter reduction until the point at which it solidifies. Usually the threadline is cooled by chilled air that is blown in a transverse direction to the threadline. U.S. Pat. No. 6,395,392, which is incorporated herein by reference, describes equipment suitable for forming the bi-component conductive polymer structures of the present invention.

The present invention will be illustrated in more detail with reference to the following examples, which should not be construed to be limiting in scope of the present invention.

EXAMPLE 1

About 5.0 wt. % of multi-faceted graphitic nanotubes were incorporated into a polycarbonate. The bulk resistivity of the polycarbonate containing multi-faceted nanotubes will be found to be about $10^5$ Ω. cm and a corresponding surface resistivity will be found to be about $10^4$ Ω. cm². If this sheet of polymcarbonate containing graphitic nanotubes is covered with a second sheet of polycarbonate, but instead containing about 5 wt. % of either "platelet" or "herringbone" graphite nanofibers the surface resistivity of this combination to found to reach a value of about $10^3$ Ω. cm². That is, the surface conductivity will be found to be enhanced by a factor of 10.

EXAMPLE 2

The combination of the hollow tubular structure of the multi-walled multi-faceted carbon nanotube and the "platelet" graphite nanofiber structure offers high electrically conductivity and exclusive gas transport channels, since the internal diameter of the former materials is about 3 nm and for the most part inaccessible to liquids. The utilization of carbon nanostructures in the Gas Diffusion Layer results in a surface that has a significantly lower degree of roughness than that of the currently used materials. As a consequence, when a newly fabricated Gas Diffusion Layer is brought into contact with a membrane perforations or leaks will be substantially reduced.

EXAMPLE 3

In a series of experiments, various types of carbons were dispersed in aqueous solution and blended with a polyethylene terephthalate (PET) resin to produce conductive inks. The data presented in Table 1 shows the wt. % (of the resin) carbon filler loading and the corresponding electrical resistivities of the inks. Examination of the results clearly demonstrates that the ink containing the bi-component filler exhibits the highest electrical conductivity.

TABLE 1

Electrical Resistivity of Various Conductive Inks

| Filler | Wt. % carbon | Resistivity ohm · cm |
|---|---|---|
| Carbon Black | 1.0 | $1 \times 10^{12}$ |
| Multi-faceted Nanotube | 1.0 | $2 \times 10^{6}$ |
| Multi-faceted graphite nanotube + platelet graphite nanofiber (4:1) | 1.0 | $1 \times 10^{5}$ |

What is claimed is:

1. A conductive polymeric composite structure having a horizontal plane, which polymeric composite structure is comprised of: at least one polymer layer wherein the conductivity is provided by: i) an effective amount of a first conductive graphitic nanofiber comprised of graphite platelets that are aligned substantially parallel to the longitudinal axis of the nanofiber and which first graphitic nanofiber is aligned substantially parallel to the horizontal plane of the composite polymeric composite structure; and ii) an effective amount of a second conductive graphitic nanofiber comprised of graphite platelets that are aligned at an angle greater than 0° to 90° with respect to the longitudinal axis of the nanofiber and wherein said second conductive graphitic nanofibers are also aligned substantially parallel to the horizontal plane of the polymeric composite structure, and wherein the angled platelet graphite nanofibers are located at the surface of the polymer structure; wherein a fraction of the angled graphite platelet nanofibers protrude from the polymer surface.

2. The conductive polymeric composite structure of claim 1 wherein said first conductive graphitic nanofiber having graphite platelets aligned substantially parallel to the longitudinal axis of the nanofiber is selected from: i) single walled multi-faceted nanotubular nanofiber wherein the graphite platelets are rectangular and are bonded to each other on their long edges to form a multi-faceted tubular structure; ii) multi-walled multi-faceted nanotubular nanofiber wherein the graphite platelets are rectangular and are bonded to each other on their long edges to form a multi-faceted tubular structure; iii) a ribbon nanofiber comprised of platelet aligned substantially parallel to each other but not bonded to each other; iv) single walled substantially cylindrical nanotubes; and v) multi-walled substantially cylindrical nanotubes.

3. The conductive polymeric composite structure of claim 2 wherein said first conductive graphitic nanofiber having graphite platelets aligned substantially parallel to the longitudinal axis of the nanofiber is a single walled multi-faceted nanotubular nanofiber wherein the graphite platelets are rectangular and are bonded to each other on their long edges to form a multi-faceted tubular structure.

4. The conductive polymeric composite structure of claim 2 wherein said first conductive graphitic nanofiber having graphite platelets aligned substantially parallel to the longitudinal axis of the nanofiber is a multi-walled multi-faceted nanotubular nanofiber structure wherein the graphite platelets are rectangular and are bonded to each other on their long edges to form a multi-walled multi-faceted tubular structure.

5. The conductive polymeric composite structure of claim 2 wherein said first conductive graphitic nanofiber having graphite platelets aligned substantially parallel to the longitudinal axis of the nanofiber is a ribbon nanofiber wherein the graphite platelets arc rectangular and are not bonded to each other.

6. The conductive polymeric composite structure of claim 1 wherein said second conductive graphitic nanofiber is comprised of graphite platelets that are aligned substantially perpendicular to the longitudinal axis of the nanofiber.

7. The conductive polymeric composite structure of claim 1 wherein said second conductive graphitic nanofiber is comprised of graphite platelets that are aligned substantially perpendicular to the longitudinal axis of the nanofiber and said first conductive graphitic nanofiber is selected from a) single walled multi-faceted nanotubular nanofibers wherein the graphite platelets are rectangular and are bonded to each other on their long edges to form a multi-faceted tubular structure; and b) multi-walled multi-faceted nanotubular nanofibers wherein the graphite platelets are rectangular and are bonded to each other on their long edges to form a multi-walled multi-faceted tubular structure.

8. The conductive polymeric composite structure of claim 1 tat is selected from the group consisting of a single layer sheet, a multi-layer sheet, a fiber, a film, and a coating.

9. The conductive polymeric composite structure of claim 8 wherein the structure is selected from a sheet and a fiber.

10. The conductive polymeric composite structure of claim 7 that is selected from the group consisting of a single layer sheet, a multi-layer sheet, a fiber, a film, and a coating.

11. The conductive polymeric composite structure of claim 1 which is a single sheet and wherein the polymer is polytetrafluoroethylene.

12. The conductive polymeric composite structure of claim 1 that is comprised to two distinct polymer layers each fused to each other and each layer contains an effective amount of each of said first and second conductive graphitic nanofiber.

13. The conductive polymeric composite structure of claim 12 wherein one polymer layer is comprised of an isotactic polypropyiene and the other polymer layer is comprised of a syndiotatic polypropylene.

14. A conductive polymeric bicomponent fiber comprising a polymeric core surrounded by a polymer sheath fused thereto, wherein said polymeric core contains an effective amount of a first conductive graphitic nanofibers comprised of graphite platelets that arc aligned substantially parallel to the longitudinal axis of the nanofiber, which first conductive graphitic nanofibers are aligned substantially parallel to the longitudinal axis of the fiber; and wherein said sheath is comprised of an effective amount of a second conductive graphitic nanofibers comprised of graphite platelets that are aligned at an angle greater than 0° to 90° with respect to the longitudinal axis of the nanofiber and wherein said second conductive graphitic nanofibers are also aligned substantially parallel to the longitudinal axis of the fiber.

15. The bicomponent fiber of claim 14 wherein said first conductive graphitic nanofiber having graphite platelets aligned substantially parallel to the longitudinal axis of the nanofiber is selected from: i) single walled multi-faceted nanotubular nanofiber wherein the graphite platelets are rectangular and are bonded to each other on their long edges to form a multi-faceted tubular structure; ii) multi-walled multi-faceted nanotubular nanofiber wherein the graphite platelets are rectangular and are bonded to each other on their long edges to form a multi-faceted tubular structure; iii) a ribbon nanofiber comprised of platelet aligned substantially parallel to each other but not bonded to each other; iv) single walled substantially cylindrical nanotubes; and v) multi-walled substantially cylindrical nanotubes.

16. The bicomponent fiber of claim 15 wherein said first conductive graphitic nanofiber having graphite platelets aligned substantially parallel to the longitudinal axis of the nanofiber is a single walled multi-faceted nanotubular nanofiber wherein the graphite platelets arc rectangular and we bonded to each other on their long edges to form a multi-faceted tubular structure.

17. The bicomponent fiber of claim 15 wherein said first conductive graphitic nanofiber having graphite platelets aligned substantially parallel to the longitudinal axis of the nanofiber is a multi-walled multi-faceted nanotubular nanofiber structure wherein the graphite platelets are rectangular and are bonded to each other on their long edges to form a multi-walled multi-faceted tubular structure.

18. The bicomponent fiber of claim 15 wherein said first conductive graphitic nanofiber having graphite platelets aligned substantially parallel to the longitudinal axis of the nanofiber is a ribbon nanofiber wherein the graphite platelets are rectangular and are not bonded to each other.

19. The bicomponent fiber of claim 14 wherein said second conductive graphitic nanofiber is comprised of graphite platelets that are aligned substantially perpendicular to the longitudinal axis of the nanofiber.

20. The bicomponent fiber of claim 14 wherein said core and said sheath contain different polymers selected from isotactic polypropylene and syndiotatic polypropylene.

21. A conductive polymeric structure having a horizontal plane and being comprised of three of more polymer layers wherein there are two outside polymer layers and one or more inside polymer layers, and wherein said one or more inside layers contain an effective amount of a first conductive graphitic nanofibers comprised of graphite platelets that are aligned substantially parallel to the longitudinal axis of the nanofiber, which first conductive graphitic nanofibers are aligned substantially parallel to the horizontal plane of the structure; and wherein said two outside layers contains an effective amount of a second conductive graphitic nanofibers comprised of graphite platelets that are aligned at an angle greater than 0° to 90° with respect to the longitudinal axis of the nanofiber and wherein said second conductive graphitic nanofibers are also aligned substantially parallel to the longitudinal axis of the fiber.

22. The conductive polymeric composite structure of claim 21 wherein said first conductive graphitic nanofiber having graphite platelets aligned substantially parallel to the longitudinal axis of the nanofiber is selected from: i) single walled multi-faceted nanotubular nanofiber wherein the graphite platelets are rectangular and are bonded to each other on their long edges to form a multi-faceted tubular structure; ii) multi-walled multi-faceted nanotubular nanofiber wherein the graphite platelets are rectangular and are bonded to each other on their long edges to form a multi-faceted tubular structure; iii) a ribbon nanofiber comprised of platelet aligned substantially parallel to each other but not bonded to each other; iv) single walled substantially cylindrical nanotubes; and v) multi-walled substantially cylindrical nanotubes.

23. The conductive polymeric structure of claim 22 wherein said first conductive graphitic nanofiber having graphite platelets aligned substantially parallel to the longitudinal axis of the nanofiber is a single walled multi-faceted nanotubular nanofiber wherein the graphite platelets are rectangular and are bonded to each other on their long edges to form a multi-faceted tubular structure.

24. The conductive polymeric structure of claim 22 wherein said first conductive graphitic nanofiber having graphite platelets aligned substantially parallel to the longitudinal axis of the nanofiber is a multi-walled multi-faceted nanotubular nanofiber structure wherein the graphite platelets are rectangular and are bonded to each other on their long edges to form a multi-walled multi-faceted tubular structure.

25. The conductive polymeric structure of claim 22 wherein said first conductive graphitic nanofiber having graphite platelets aligned substantially parallel to the longitudinal axis of the nanofiber is a ribbon nanofiber wherein the graphite platelets are rectangular and are not bonded to each other.

26. The conductive polymeric structure of claim 21 wherein said second conductive graphitic nanofiber is comprised of graphite platelets that are aligned substantially perpendicular to the longitudinal axis of the nanofiber.

27. The conductive polymeric structure of claim 21 wherein there are three polymer layers.

28. A method for increasing the conductivity of a polymer, which method comprising adding to said polymer: i) an effective amount of a first conductive graphitic nanofiber comprised of graphite platelets that are aligned substantially parallel to the longitudinal axis of the nanofiber; and ii) an effective amount of a second conductive graphitic nanofiber comprised of graphite platelets that are aligned at an angle greater than 0° to 90° with respect to the longitudinal axis of the nanofiber.

29. The method of claim 28 wherein said first conductive graphitic nanofiber having graphite platelets aligned substantially parallel to the longitudinal axis of the nanofiber is selected from: i) single walled multi-faceted nanotubular nanofiber wherein the graphite platelets are rectangular and are bonded to each other on their long edges to form a multi-faceted tubular structure; ii) multi-walled multi-faceted nanotubular nanofiber wherein the graphite platelets are rectangular and are bonded to each other on their long edges to form a multi-faceted tubular structure; iii) a ribbon nanofiber comprised of platelet aligned substantially parallel to each other but not bonded to each other; iv) single walled substantially cylindrical nanotubes; and v) multi-walled substantially cylindrical nanotubes.

30. The method of claim 29 wherein said first conductive graphitic nanofiber having graphite platelets aligned substantially parallel to the longitudinal axis of the nanofiber is a single walled multi-faceted nanotubular nanofiber wherein the graphite platelets arc rectangular and are bonded to each other on their long edges to form a multi-faceted tubular structure.

31. The method of claim 30 wherein said first conductive graphitic nanofiber having graphite platelets aligned substantially parallel to the longitudinal axis of the nanofiber is a multi-walled multi-faceted nanotubular nanofiber structure wherein the graphite platelets are rectangular and are bonded to each other on their long edges to form a multi-walled multi-faceted tubular structure.

32. The method of claim 30 wherein said first conductive graphitic nanofiber having graphite platelets aligned substantially parallel to the longitudinal axis of the nanofiber is a ribbon nanofiber wherein the graphite platelets are rectangular and are not bonded to each other.

33. The method of claim 29 wherein said second conductive graphitic nanofiber is comprised of graphite platelets that are aligned substantially perpendicular to the longitudinal axis of the nanofiber.

* * * * *